US009663085B2

(12) United States Patent
Tanabe et al.

(10) Patent No.: US 9,663,085 B2
(45) Date of Patent: May 30, 2017

(54) MASTER CYLINDER

(71) Applicant: HITACHI AUTOMOTIVE SYSTEMS, LTD., Hitachinaka-shi, Ibaraki (JP)

(72) Inventors: Seiko Tanabe, Nakakoma-gun (JP); Yoichi Kumemura, Yokohama (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 361 days.

(21) Appl. No.: 14/387,149

(22) PCT Filed: Mar. 27, 2013

(86) PCT No.: PCT/JP2013/059063
§ 371 (c)(1),
(2) Date: Sep. 22, 2014

(87) PCT Pub. No.: WO2013/179751
PCT Pub. Date: Dec. 5, 2013

(65) Prior Publication Data
US 2015/0047338 A1 Feb. 19, 2015

(30) Foreign Application Priority Data
May 31, 2012 (JP) .................................. 2012-125136

(51) Int. Cl.
*B60T 11/236* (2006.01)
*F16J 15/16* (2006.01)
(Continued)

(52) U.S. Cl.
CPC ........... *B60T 11/236* (2013.01); *F16J 15/164* (2013.01); *F16J 15/18* (2013.01); *F16J 15/3236* (2013.01)

(58) Field of Classification Search
CPC ....... B60T 11/236; B60T 11/228; F16J 15/18; F16J 15/3204; F16J 15/3232;
(Continued)

(56) References Cited

U.S. PATENT DOCUMENTS 3,563,442 A * 2/1971 Kretchman .......... F16J 15/3236
277/438
7,401,468 B2 * 7/2008 Mouri ..................... B60T 11/20
277/441
(Continued)

FOREIGN PATENT DOCUMENTS

JP      2006-123879      5/2006
JP      2008-105444      5/2008
(Continued)

OTHER PUBLICATIONS

International Search Report for PCT/JP2013/059063, mailed May 7, 2013.

*Primary Examiner* — Michael Leslie
*Assistant Examiner* — Dustin T Nguyen
(74) *Attorney, Agent, or Firm* — Nixon & Vanderhye P.C.

(57) ABSTRACT

A circumferential wall of a circumferential groove near a bottom section of a cylinder main body has an outer wall section extending from a bottom section of the circumferential groove in a radial direction of the cylinder main body, a stepped surface section extending from the outer wall section in a bottom direction of the cylinder main body, and an inner wall section having a flat surface section parallel to the radial direction of the cylinder main body and formed further inside in the radial direction of the cylinder main body than the stepped surface section. The inner wall section is formed at a position at which the center lip section first (Continued)

abuts the inner wall section prior to the outer wall section when the seal member moves toward the bottom section of the cylinder main body.

20 Claims, 10 Drawing Sheets

(51) Int. Cl.
*F16J 15/3236* (2016.01)
*F16J 15/18* (2006.01)

(58) Field of Classification Search
CPC .. F16J 15/3236; F16J 15/3268; F16J 15/3464; F16J 15/3468; F16J 15/3472; F16J 15/164
USPC .......................................................... 60/588
See application file for complete search history.

(56) References Cited

U.S. PATENT DOCUMENTS

| | | | | |
|---|---|---|---|---|
| 7,937,940 B2* | 5/2011 | Gaffe | .................... | B60T 11/236 |
| | | | | 60/588 |
| 2005/0173215 A1* | 8/2005 | Watarai | .................. | B62L 1/005 |
| | | | | 188/370 |
| 2008/0264248 A1* | 10/2008 | Okada | .................. | B60T 11/236 |
| | | | | 92/169.1 |
| 2008/0289330 A1* | 11/2008 | Gaffe | .................... | B60T 11/232 |
| | | | | 60/588 |
| 2010/0156052 A1* | 6/2010 | Bernadat | ............. | F16J 15/3236 |
| | | | | 277/648 |

FOREIGN PATENT DOCUMENTS

| | | |
|---|---|---|
| JP | 2008-111495 | 5/2008 |
| JP | 2008-290708 | 12/2008 |
| JP | 102009052568 | 5/2011 |

* cited by examiner

MASTER CYLINDER

TECHNICAL FIELD

The present invention relates to a master cylinder configured to supply a hydraulic pressure into a braking cylinder of a vehicle.

This application is the U.S. national phase of International Application No. PCT/JP2013/059063, filed Mar. 27, 2013, which designated the U.S. and claims priority to Japanese Patent Application No. 2012-125136, filed May 31, 2012, the contents of each of which are incorporated herein by reference.

BACKGROUND ART

In a master cylinder, there is a seal member configured to perform sealing of a pressure chamber while coming in sliding contact with a moving piston and disposed in a circumferential groove of a cylinder main body (for example, see Patent Literature 1).

CITATION LIST

Patent Literature

[Patent Literature 1] Japanese Unexamined Patent Application, First Publication No. 2006-123879

SUMMARY OF INVENTION

Technical Problem

In the master cylinder, upon movement of the piston, the seal member may be rotated such that an inner circumferential side and an outer circumferential side move in opposite directions in the circumferential groove along by being pulled with the piston without smooth sliding of the seal member with respect to the piston. Then, a seal position of the seal member with respect to the piston is deviated, and thus invalid strokes of the piston may increase.

The present invention provides a master cylinder capable of suppressing an increase in invalid strokes.

Solution to Problem

According to an aspect of the present invention, a master cylinder includes a cylinder main body with a bottomed cylindrical shape having an discharge passage of a brake liquid and a supply passage in communication with a reservoir, a piston movably disposed in the cylinder main body and forming a pressure chamber configured to supply a hydraulic pressure into the discharge passage between the cylinder main body and the piston, and a seal member installed in a circumferential groove formed in the cylinder main body and capable of sealing between the supply passage and the pressure chamber. The seal member has a base section capable of abutting a circumferential wall of the circumferential groove near an opening section of the cylinder main body, an inner circumferential lip section extending from the base section toward a bottom section of the cylinder main body and configured to come in sliding contact with an outer circumference of the piston, an outer circumferential lip section extending from the base section toward the bottom section of the cylinder main body and configured to abut a bottom section of the circumferential groove, and a center lip section extending from the base section toward the bottom section of the cylinder main body between the outer circumferential lip section and the inner circumferential lip section and having a distal end configured to abut the circumferential wall of the circumferential groove near the bottom section of the cylinder main body. The circumferential wall of the circumferential groove near the bottom section of the cylinder main body has an outer wall section extending from the bottom section of the circumferential groove in a radial direction of the cylinder main body, a stepped surface section extending from the outer wall section in a bottom direction of the cylinder main body, and an inner wall section having a flat surface section parallel to the radial direction of the cylinder main body and formed further inside in the radial direction of the cylinder main body than the stepped surface section. The inner wall section is formed at a position at which the center lip section abuts the inner wall section prior to the outer wall section when the seal member moves toward the bottom section of the cylinder main body.

The stepped surface section may be formed to be inclined with respect to the axial direction of the cylinder main body.

The flat surface section of the inner wall section may be formed at a position at which the center lip section first abuts the flat surface section of the inner wall section when the seal member moves toward the bottom section of the cylinder main body.

The center lip section may be formed to protrude in the axial direction farther than the outer circumferential lip section and the inner circumferential lip section.

Advantageous Effects of Invention

According to the above-mentioned master cylinder, an increase in invalid strokes can be suppressed.

DESCRIPTION OF EMBODIMENTS

[First Embodiment]

Figure 1:
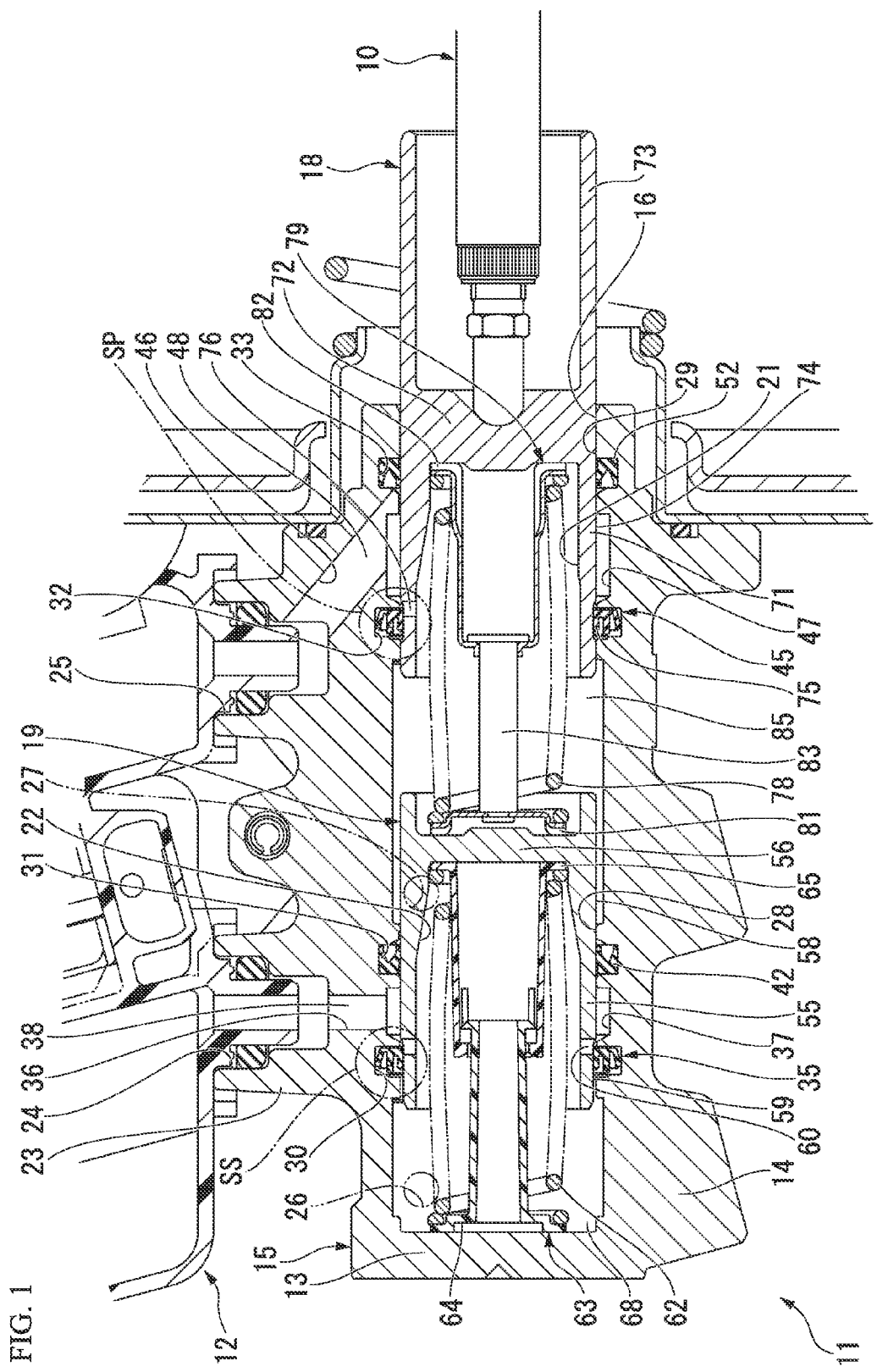
FIG. 1 is a cross-sectional view showing a master cylinder of a first embodiment according to the present invention.

A first embodiment according to the present invention will be described with reference to FIGS. 1 to 4C. As shown in FIG. 1, a master cylinder 11 of the first embodiment is configured to receive a force according to a manipulation amount of a brake pedal via an output shaft 10 of a brake booster, and generate a brake hydraulic pressure according to the manipulation amount of the brake pedal. A reservoir 12 configured to supply and exhaust a brake liquid is attached to an upper side in a vertical direction of the master cylinder 11. Further, while the reservoir 12 is directly attached to the master cylinder 11 in this embodiment, the reservoir may be disposed at a position spaced apart from the master cylinder 11, and the reservoir and the master cylinder 11 may be connected by a pipeline.

The master cylinder 11 has a metal cylinder main body 15 that is processed and formed from one material and has a bottomed cylindrical shape provided with a bottom section 13 and a cylindrical section 14. The cylinder main body 15 is disposed at the vehicle in a posture in which an axial direction is directed in a forward/rearward direction of the vehicle. A primary piston (a piston) 18 formed of a metal is movably disposed at an opening section 16 side of the cylinder main body 15. In addition, a secondary piston (a piston) 19, which is formed of a metal in the same manner as the primary piston 18, is movably disposed closer to the bottom section 13 than the primary piston 18 of the cylinder main body 15. An inner circumferential hole 21 having a bottom surface is formed in the primary piston 18. An inner circumferential hole 22 having a bottom surface is formed in the secondary piston 19. The master cylinder 11 is a so-called plunger type master cylinder. In addition, the master cylinder 11 is a tandem type master cylinder having the above-mentioned two pistons 18 and 19. Further, the present invention is not limited to the tandem type master cylinder and may also be applied to any plunger type master cylinder such as a single type master cylinder having one piston disposed at a cylinder main body, a master cylinder having three or more pistons, or the like, as long as it is a plunger type master cylinder.

An attachment frame section 23 protruding outward in a radial direction of the cylindrical section 14 (hereinafter referred to as a cylinder radial direction) is integrally formed with the cylinder main body 15 at a predetermined position in a circumferential direction of the cylindrical section 14 (hereinafter referred to as a cylinder circumferential direction). Attachment holes 24 and 25 configured to attach the reservoir 12 are formed in the attachment frame section 23. Further, in the embodiment, the attachment holes 24 and 25 are formed by deviating positions in a direction of an axis of the cylindrical section 14 (hereinafter referred to as a cylinder axis) of the cylinder main body 15 in a state in which positions in the cylinder circumferential direction coincide with each other.

A secondary discharge passage (an discharge passage) 26 in the vicinity of the bottom section 13 is formed at the attachment frame section 23 side of the cylindrical section 14 of the cylinder main body 15. A primary discharge passage (an discharge passage) 27 is formed closer to the opening section 16 than the secondary discharge passage 26. While not shown, the secondary discharge passage 26 and the primary discharge passage 27 are in communication with a braking cylinder such as a disk brake, a drum brake, or the like, via a brake pipeline, and eject a brake liquid toward the braking cylinder. Further, in the embodiment, the secondary discharge passage 26 and the primary discharge passage 27 are formed at positions deviated in the cylinder axis direction in a state in which positions in the cylinder circumferential direction coincide with each other.

The secondary piston 19 is slidably guided to a sliding inner diameter section 28 having a cylindrical surface shape formed at an inner circumferential section of the bottom section 13 side of the cylindrical section 14 of the cylinder main body 15 about the cylinder axis. The primary piston 18 is slidably guided to a sliding inner diameter section 29 having a cylindrical surface shape formed at an inner circumferential section of the opening section 16 side of the cylindrical section 14 of the cylinder main body 15 about the cylinder axis.

A plurality of, specifically two, circumferential grooves 30 and 31, both of which have an annular shape, are formed at the sliding inner diameter section 28 at positions deviated in the cylinder axis direction in sequence from the bottom section 13 side. In addition, a plurality of, specifically two, circumferential grooves 32 and 33, both of which have an annular shape, are also formed at the sliding inner diameter section 29 at positions deviated in the cylinder axis direction in sequence from the bottom section 13 side. The circumferential grooves 30 to 33 form an annular shape in the cylinder circumferential direction to have a shape concaved outward in the cylinder radial direction. All the circumferential grooves 30 to 33 are formed by cutting.

The circumferential groove 30 closest to the bottom section 13 is formed in the vicinity of the attachment hole 24 of the bottom section 13 side in the attachment holes 24 and 25. An annular piston seal (a seal member) 35 is disposed in the circumferential groove 30 to be held in the circumferential groove 30.

An annular opening groove 37 concaved outward in the cylinder radial direction is formed closer to the opening section 16 than the circumferential groove 30 in the sliding inner diameter section 28 of the cylinder main body 15 such that a communication hole 36 punched from the attachment hole 24 of the bottom section 13 side is opened in the cylindrical section 14. Here, the opening groove 37 and the communication hole 36 are formed in the cylinder main body 15 to mainly configure a secondary supply passage (a supply passage) 38 in constant communication with the reservoir 12.

A communication groove (not shown) opened in the circumferential groove 30 and extending from the circumferential groove 30 toward the bottom section 13 linearly in the cylinder axis direction is formed in the sliding inner diameter section 28 of the cylinder main body 15 to be concaved outward in the cylinder radial direction. The communication groove communicates the secondary discharge passage 26 with the circumferential groove 30 disposed between the bottom section 13 and the circumferential groove 30 and positioned in the vicinity of the bottom section 13 via a secondary pressure chamber 68 (to be described below).

The circumferential groove 31 is formed in the sliding inner diameter section 28 of the cylinder main body 15 at an opposite side of the circumferential groove 30 of the opening groove 37 in the cylinder axis direction, i.e., at the opening section 16 side. An annular division seal 42 is disposed in the circumferential groove 31 to be held in the circumferential groove 31.

The above-mentioned circumferential groove 32 is formed in the sliding inner diameter section 29 of the cylinder main body 15 in the vicinity of the attachment hole 25 of the opening section 16 side. An annular piston seal (a seal member) 45 is disposed in the circumferential groove 32 to be held in the circumferential groove 32.

An annular opening groove 47 concaved outward in the cylinder radial direction is formed at the opening section 16 side of the circumferential groove 32 in the sliding inner diameter section 29 of the cylinder main body 15 such that a communication hole 46 punched from the attachment hole 25 of the opening section 16 side is opened in the cylindrical section 14. Here, the opening groove 47 and the communication hole 46 are formed in the cylinder main body 15 to mainly configure a primary supply passage (a supply passage) 48 in constant communication with the reservoir 12.

A communication groove (not shown) opened in the circumferential groove 32 and extending from the circumferential groove 32 toward the bottom section 13 linearly in the cylinder axis direction is formed at the bottom section 13 side of the circumferential groove 32 of the sliding inner diameter section 29 of the cylinder main body 15 to be concaved outward in the cylinder radial direction. The communication groove communicates the primary discharge passage 27 with the circumferential groove 32 formed at a position in the vicinity of the circumferential groove 31 via a primary pressure chamber 85 (to be described below).

The circumferential groove 33 is formed at an opposite side of the circumferential groove 32 of the opening groove 47 in the sliding inner diameter section 29 of the cylinder main body 15, i.e., at the opening section 16 side. An annular division seal 52 is disposed in the circumferential groove 33 to be held in the circumferential groove 33.

The secondary piston 19 fitted to the bottom section 13 side of the cylinder main body 15 forms a bottomed cylindrical shape having a cylindrical portion 55 and a bottom section 56 formed at one side in the axial direction of the cylindrical portion 55. The inner circumferential hole 22 is configured of the cylindrical portion 55 and the bottom section 56. The secondary piston 19 is slidably fitted to inner circumferences of the piston seal 35 and the division seal 42 formed at the sliding inner diameter section 28 of the cylinder main body 15 in a state in which the cylindrical portion 55 is disposed at the bottom section 13 side of the cylinder main body 15. An annular stepped section 59 having a stepped shape to be disposed further inside in the radial direction than an outer diameter section 58 having the largest diameter in the secondary piston 19 is formed at an outer circumferential side of an end section opposite to the bottom section 56 of the cylindrical portion 55. A plurality of ports 60 passing through the cylinder radial direction at the bottom section 56 side are formed at the stepped section 59 radially at equal intervals in the cylinder circumferential direction.

A gap adjustment section 63 including a secondary piston spring 62 configured to determine an interval between the secondary piston 19 and the bottom section 13 of the cylinder main body 15 in a non-braking state in which there is no input from a brake pedal (not shown) side (a right side of FIG. 1) is installed therebetween. The gap adjustment section 63 has a hooking member 64 configured to abut the bottom section 13 of the cylinder main body 15, and a hooking member 65 connected to slide on the hooking member 64 only within a predetermined range and configured to abut the bottom section 56 of the secondary piston 19. The secondary piston spring 62 is interposed between the hooking members 64 and 65 of both sides.

Here, a portion surrounded by the bottom section 13 of the cylinder main body 15 and the bottom section 13 side of the cylindrical section 14, and the secondary piston 19 becomes the secondary pressure chamber (the pressure chamber) 68 configured to generate a brake hydraulic pressure to supply the brake hydraulic pressure to the secondary discharge passage 26. In other words, the secondary piston 19 forms the secondary pressure chamber 68 between the cylinder main body 15 and the secondary piston 19 to supply a hydraulic pressure into the secondary discharge passage 26. The secondary pressure chamber 68 is configured to come in communication with the secondary supply passage 38 when the secondary piston 19 is positioned to open the port 60 in the opening groove 37.

The division seal 42 held in the circumferential groove 31 of the cylinder main body 15 is an integrally formed product formed of a synthetic rubber. The division seal 42 is configured such that one side of a cross section in the radial direction including a centerline thereof has a C shape. The division seal 42 constantly seals a gap of a position between the secondary piston 19 and the division seal 42 of the cylinder main body 15 while an inner circumference of the division seal 42 is in sliding contact with an outer circumference of the secondary piston 19 and an outer circumference of the division seal 42 abuts the circumferential groove 31 of the cylinder main body 15.

The piston seal 35 held in the circumferential groove 30 of the cylinder main body 15 is an integrally formed product formed of a synthetic rubber such as EPDM or the like. The piston seal 35 is configured such that the outer circumference of the piston seal 35 abuts the circumferential groove 30 of the cylinder main body 15 while the inner circumference of the piston seal 35 is in sliding contact with the outer circumference of the secondary piston 19. The piston seal 35 is capable of sealing a space between the secondary supply passage 38 and the secondary pressure chamber 68, i.e., is capable of blocking communication of the secondary pressure chamber 68 with the secondary supply passage 38 and the reservoir 12 in a state in which the secondary piston 19 disposes the port 60 closer to the bottom section 13 than the piston seal 35. In this state, the secondary piston 19 slides on the inner circumferences of the piston seal 35 and the division seal 42 held at the sliding inner diameter section 28 of the cylinder main body 15 and the cylinder main body 15 to move toward the bottom section 13, and thus presses the brake liquid in the secondary pressure chamber 68 to supply the brake liquid from the secondary discharge passage 26 into the braking cylinder of the wheel side.

Further, when there is no input from the brake pedal (not shown) side and the above-mentioned secondary piston 19 is disposed at a position (a non-braking position) at which the port 60 is opened in the opening groove 37, the piston seal 35 is configured such that a portion thereof overlaps the port 60 in the stepped section 59 of the secondary piston 19. Then, when the secondary piston 19 moves toward the bottom section 13 of the cylinder main body 15 and the inner circumferential section of the piston seal 35 overlaps the port 60 as a whole, communication between the secondary pressure chamber 68 and the reservoir 12 is blocked.

The primary piston 18 fitted to the opening section 16 side of the cylinder main body 15 forms a shape having a first cylindrical portion 71, a bottom section 72 formed at one side in the axial direction of the first cylindrical portion 71, and a second cylindrical portion 73 formed at an opposite side of the first cylindrical portion 71 of the bottom section 72. The inner circumferential hole 21 is formed by the first cylindrical portion 71 and the bottom section 72 among them. The primary piston 18 is slidably fitted to the inner circumferences of the piston seal 45 and the division seal 52 installed at the sliding inner diameter section 29 of the cylinder main body 15 in a state in which the first cylindrical portion 71 is disposed at the secondary piston 19 side in the cylinder main body 15. Here, the output shaft 10 of the brake booster is inserted into the second cylindrical portion 73. The bottom section 72 is pressed by the output shaft 10.

An annular stepped section 75 having a stepped shape is formed at the outer circumferential side of the end section opposite to the bottom section 72 of the first cylindrical portion 71 to be disposed further inside in the radial direction than an outer diameter section 74 having a largest diameter in the primary piston 18. A plurality of ports 76 passing through the radial direction at the bottom section 72 side are formed at the stepped section 75 at equal intervals in the cylinder circumferential direction to form a radial shape.

A gap adjustment section 79 including a primary piston spring 78 configured to determine an interval between the secondary piston 19 and the primary piston 18 in a non-braking state in which there is no input from the brake pedal (not shown) side is formed between the secondary piston 19 and the primary piston 18. The gap adjustment section 79 has a hooking member 81 configured to abut the bottom section 56 of the secondary piston 19, a hooking member 82 configured to abut the bottom section 72 of the primary piston 18, and a shaft member 83 having one end section fixed to the hooking member 81 and configured to slidably support the hooking member 82 only within a predetermined range. The primary piston spring 78 is interposed between the hooking members 81 and 82 of both sides.

Here, a portion surrounded by the cylindrical section 14 of the cylinder main body 15 and the secondary piston 19 of the primary piston 18 configures a primary pressure chamber (the pressure chamber) 85 configured to generate a brake hydraulic pressure and supply the brake liquid into the primary discharge passage 27. In other words, the primary piston 18 forms the primary pressure chamber 85 configured to supply a hydraulic pressure into the primary discharge passage 27 between the secondary piston 19 and the cylinder main body 15. The primary pressure chamber 85 comes in communication with the primary supply passage 48 when the primary piston 18 is disposed at a position at which the port 76 is opened in the opening groove 47.

The division seal 52 held in the circumferential groove 33 of the cylinder main body 15 is the same part as the division seal 42 and an integrally formed product formed of synthetic rubber. One side of a cross section in the radial direction including the centerline of the division seal 52 has a C shape. The division seal 52 constantly seals a gap of a position between the primary piston 18 and the division seal 52 of the cylinder main body 15 while an inner circumference of the division seal 52 comes in sliding contact with the outer circumference of the primary piston 18 and an outer circumference of the divisional seal 52 abuts the circumferential groove 33 of the cylinder main body 15.

The piston seal 45 held in the circumferential groove 32 of the cylinder main body 15 is the same part as the piston seal 35, and is an integrally formed product formed of synthetic rubber. The piston seal 45 is configured such that the inner circumference of the piston seal 45 comes in sliding contact with the outer circumference of the primary piston 18 and the outer circumference of the piston seal 45 abuts the circumferential groove 32 of the cylinder main body 15. The piston seal 45 is capable of sealing a space between the primary supply passage 48 and the primary pressure chamber 85, i.e., is capable of blosking communication of the primary pressure chamber 85 with the primary supply passage 48 and the reservoir 12 in a state in which the primary piston 18 disposes the port 76 closer to the bottom section 13 than the piston seal 45. In this state, as the primary piston 18 slides along the sliding inner diameter section 29 of the cylinder main body 15 and the inner circumferences of the piston seal 45 and the division seal 52 held in the cylinder main body 15 to move toward the bottom section 13, the brake liquid in the primary pressure chamber 85 is pressed to be supplied from the primary discharge passage 27 into the braking cylinder of the wheel side.

Further, when there is no input from the brake pedal (not shown) side and the above-mentioned primary piston 18 is disposed at a position (a non-braking position) at which the port 76 is opened in the opening groove 47, the piston seal 45 is configured such that a portion thereof overlaps the port 76 in the stepped section 75 of the primary piston 18. Then, when the primary piston 18 moves toward the bottom section 13 of the cylinder main body 15 and the inner circumferential section of the piston seal 45 overlaps the port 76 as a whole, communication between the primary pressure chamber 85 and the reservoir 12 is blocked.

A seal structure section SS of a secondary side configured of the vicinity portion of the circumferential groove 30 of the cylinder main body 15, the piston seal 35 and the sliding contact portion of the piston seal 35 of the secondary piston 19, and a seal structure section SP of a primary side configured of the vicinity portion of the circumferential groove 32 of the cylinder main body 15, the piston seal 45 and the sliding contact portion of the piston seal 45 of the primary piston 18 have the same structure. Accordingly, in the following description, the seal structure section SP of the primary side is an exemplary example and a detailed description thereof will be provided with reference to mainly FIGS. 2 to 4C.

Figure 2:
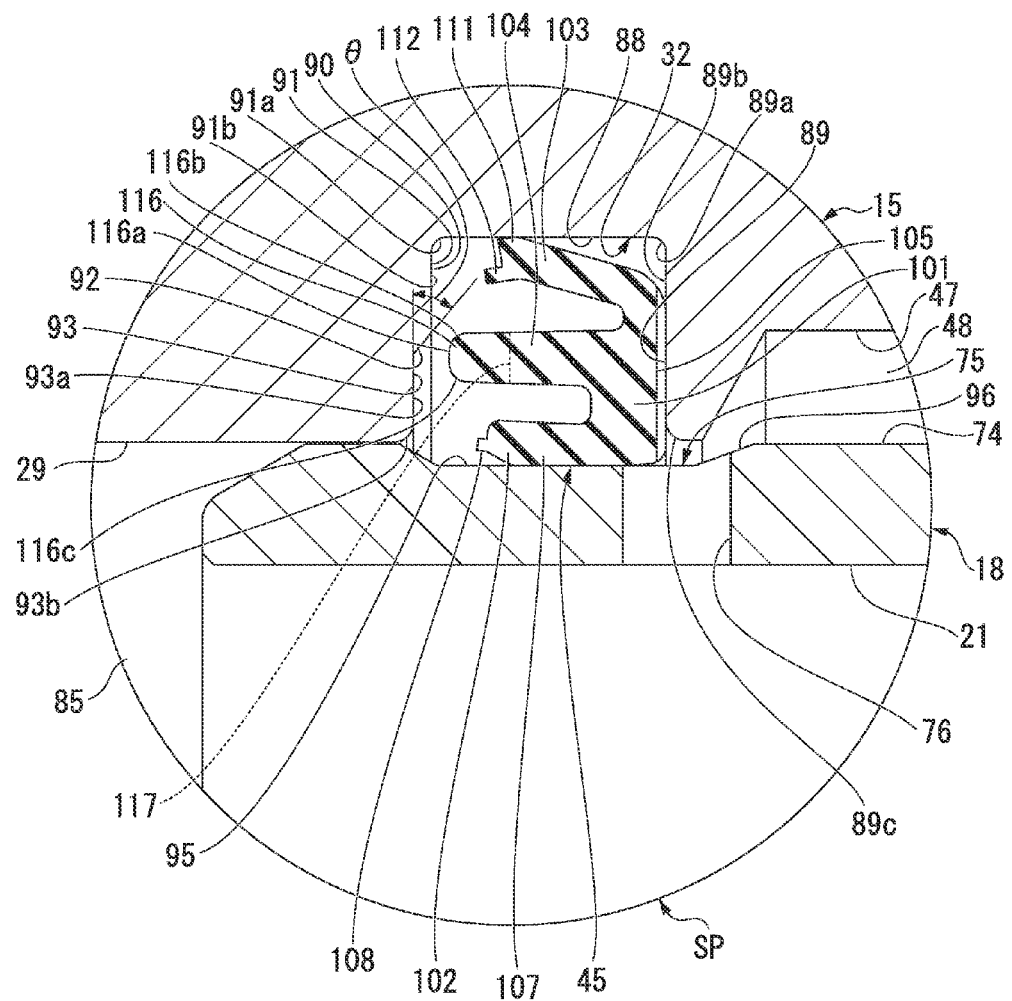
FIG. 2 is a partially enlarged cross-sectional view showing major parts of the master cylinder of the first embodiment.

As shown in FIG. 2, the circumferential groove 32 has a groove bottom section (a bottom section of a circumferential groove) 88 having a cylindrical surface shape disposed farthest outside in the cylinder radial direction (an upper side of FIG. 2) about the cylinder axis, a circumferential wall 89 formed at a position of an edge section of the opening section 16 side (a right side of FIG. 2) of the cylinder main body 15 in the groove bottom section 88 in a direction perpendicular to the cylinder axis, and a circumferential wall 90 formed at a position of an edge section of the bottom section 13 side (a left side of FIG. 2) of the cylinder main body 15 in the groove bottom section 88 in a direction perpendicular to the cylinder axis.

The circumferential wall 89 is configured of a curved surface section 89a formed at an outer end position in the cylinder radial direction, a flat surface section 89b formed further inside in the cylinder radial direction than the curved surface section 89a, and an R chamfering section 89c formed at an inner end position in the cylinder radial direction. The curved surface section 89a slightly extends to be inclined in the cylinder axis direction to approach the opening section 16 side of the cylinder main body 15 as it goes from the edge section of the groove bottom section 88 near the opening section 16 side of the cylinder main body 15 inward in the cylinder radial direction, and has an arc shape in which a cross section including the cylinder axis has a center inside the circumferential groove 32. The curved surface section 89a has a substantially fixed width in the cylinder radial direction and a substantially fixed length in the cylinder axis direction, and forms an annular shape about the cylinder axis.

The flat surface section 89b is configured of a flat surface parallel to a surface perpendicular to the cylinder axis. The flat surface section 89b extends from the inner edge section in the cylinder radial direction of the curved surface section 89a with a fixed width inward in the cylinder radial direction, and forms an annular shape about the cylinder axis. The R chamfering section 89c extends to be inclined in the cylinder axis direction to approach the opening section 16 side of the cylinder main body 15 as it goes from the inner edge section in the cylinder radial direction of the flat surface section 89b inward in the cylinder radial direction, and forms an arc shape in which a cross section including the cylinder axis has a center outside of the circumferential groove 32. The R chamfering section 89c has a fixed width in the cylinder radial direction and a fixed length in the cylinder axis direction, and forms an annular shape about the cylinder axis. The inner edge section in the cylinder radial direction of the R chamfering section 89c is connected to a portion closer to the opening section 16 than the circumferential groove 32 of the sliding inner diameter section 29.

The circumferential wall 90 opposite to the circumferential wall 89 has an outer wall section 91 extending from the edge section of the groove bottom section 88 near the bottom section 13 of the cylinder main body 15 inward in the cylinder radial direction, a stepped surface section 92 extending in a direction of the bottom section 13 to be inclined in the cylinder axis direction to approach the the bottom section 13 side of the cylinder main body 15 as it goes from the inner edge section in the cylinder radial direction of the outer wall section 91 inward in the cylinder radial direction, and an inner wall section 93 extending from the inner edge section in the cylinder radial direction of the stepped surface section 92 inward in the radial direction of the cylinder main body 15 to be connected to the sliding inner diameter section 29. That is, the stepped surface section 92 is formed further inside in the cylinder radial direction than the outer wall section 91, and the inner wall section 93 is formed further inside in the cylinder radial direction than the stepped surface section 92.

The outer wall section 91 has a curved surface section 91a formed at an outer end position in the cylinder radial direction, and a flat surface section 91b formed further inside in the cylinder radial direction than the curved surface section 91a. The curved surface section 91a slightly extends to be inclined in the cylinder axis direction to approach the bottom section 13 of the cylinder main body 15 as it goes from the edge section of the groove bottom section 88 near the bottom section 13 of the cylinder main body 15 inward in the cylinder radial direction. The curved surface section 91a has an arc shape in which a cross section including the cylinder axis has a center inside the circumferential groove 32. The curved surface section 91a has a fixed width in the cylinder radial direction and a fixed length in the cylinder axis direction, and forms an annular shape about the cylinder axis.

The flat surface section 91b is configured of a flat surface parallel to a surface perpendicular to the cylinder axis. The flat surface section 91b extends from the inner edge section in the cylinder radial direction of the curved surface section 91a inward in the cylinder radial direction with a fixed width, and forms an annular shape about the cylinder axis. The stepped surface section 92 extends to form a tapered shape such that a diameter is reduced from the inner edge section in the cylinder radial direction of the flat surface section 91b of the outer wall section 91 toward the bottom section 13 in the cylinder axis direction as it goes toward the bottom section 13. The stepped surface section 92 has a fixed width in the cylinder radial direction and a fixed length in the cylinder axis direction, and forms an annular shape about the cylinder axis.

The inner wall section 93 has a flat surface section 93a formed at an outer end position from an intermediate position in the cylinder radial direction, and an R chamfering section 93b formed at an inner end position in the cylinder radial direction. The flat surface section 93a is configured of a flat surface parallel to a surface perpendicular to the cylinder axis. In other words, the flat surface section 93a is configured of a flat surface parallel to the radial direction of the cylinder main body 15. The flat surface section 93a extends from the inner edge section in the cylinder radial direction of the stepped surface section 92 inward in the cylinder radial direction with a fixed width, and forms an annular shape about the cylinder axis.

The R chamfering section 93b extends to be inclined in the cylinder axis direction to approach the bottom section 13 side of the cylinder main body 15 as it goes from the inner edge section in the cylinder radial direction of the flat surface section 93a inward in the cylinder radial direction, and forms an arc shape in which a cross section including the cylinder axis has a center outside the circumferential groove 32. The R chamfering section 93b has a fixed width in the cylinder radial direction and a fixed length in the cylinder axis direction, and forms an annular shape about the cylinder axis. The inner edge section in the cylinder radial direction of the R chamfering section 93b is connected to a portion closer to the bottom section 13 than the circumferential groove 32 of the sliding inner diameter section 29.

As described above, as the stepped surface section 92 extending in the cylinder axis direction is formed between the inner wall section 93 and the outer wall section 91, the inner wall section 93 is formed to be offset closer to the bottom section 13 in the cylinder axis direction than the outer wall section 91 as a whole. In other words, the width in the cylinder axis direction of the flat surface section 91b of the outer wall section 91 and the flat surface section 89b of the circumferential wall 89 parallel to each other is smaller than the width in the cylinder axis direction of the flat surface section 93a of the inner wall section 93 and the flat surface section 89b of the circumferential wall 89 parallel to each other. The width in the cylinder radial direction of the stepped surface section 92 is smaller than the width in the cylinder radial direction of the outer wall section 91, and smaller than the width in the cylinder radial direction of the inner wall section 93. The stepped surface section 92 is inclined at a predetermined angle $\theta$, which is an acute angle, with respect to the flat surface section 93a of the inner wall section 93, and thus is inclined at the same angle with respect to the flat surface section 91b of the outer wall section 91. The groove bottom section 88, the circumferential wall 89 and the circumferential wall 90 are integrally formed with the cylinder main body 15, and formed through cutting with respect to the cylinder main body 15.

The stepped section 75 formed at the primary piston 18 is configured of a cylindrical surface section 95 having a fixed diameter smaller than that of the outer diameter section 74 having the largest diameter in the primary piston 18, and a tapered surface section 96 inclined to have a diameter that increases as it goes toward the opening section 16 of the cylinder main body 15 at the opening section 16 side (a right side of FIG. 2) of the cylinder main body 15 of the cylindrical surface section 95. The cylindrical surface section 95 and the tapered surface section 96 are formed concentrically with the outer diameter section 74, a small diameter side of the tapered surface section 96 is connected to the cylindrical surface section 95, and a large diameter side of the tapered surface section 96 is connected to the outer diameter section 74. The port 76 in constant communication with the primary pressure chamber 85 is formed at a position across both the cylindrical surface section 95 and the tapered surface section 96. In other words, an end section of the port 76 near the bottom section 13 of the cylinder main body 15 (a left side of FIG. 2) is disposed at the cylindrical surface section 95, and an end section of the port 76 near the opening section 16 of the cylinder main body 15 is disposed at the tapered surface section 96.

The piston seal 45 disposed in the circumferential groove 32 is an integrally formed product formed of synthetic rubber such as EPDM or the like. The piston seal 45 has an annular base section 101 disposed at the opening section 16 side of the cylinder main body 15, an annular inner circumferential lip section 102 extending from an inner circumference end of the base section 101 toward the bottom section 13 of the cylinder main body 15 in the axial direction of the base section 101, an annular outer circumferential lip section 103 extending from an outer circumference end of the base section 101 toward the bottom section 13 of the cylinder main body 15, and an annular center lip section 104 extending from the base section 101 between the outer circumferential lip section 103 and the inner circumferential lip section 102 toward the bottom section 13 of the cylinder main body 15.

Figure 3A:
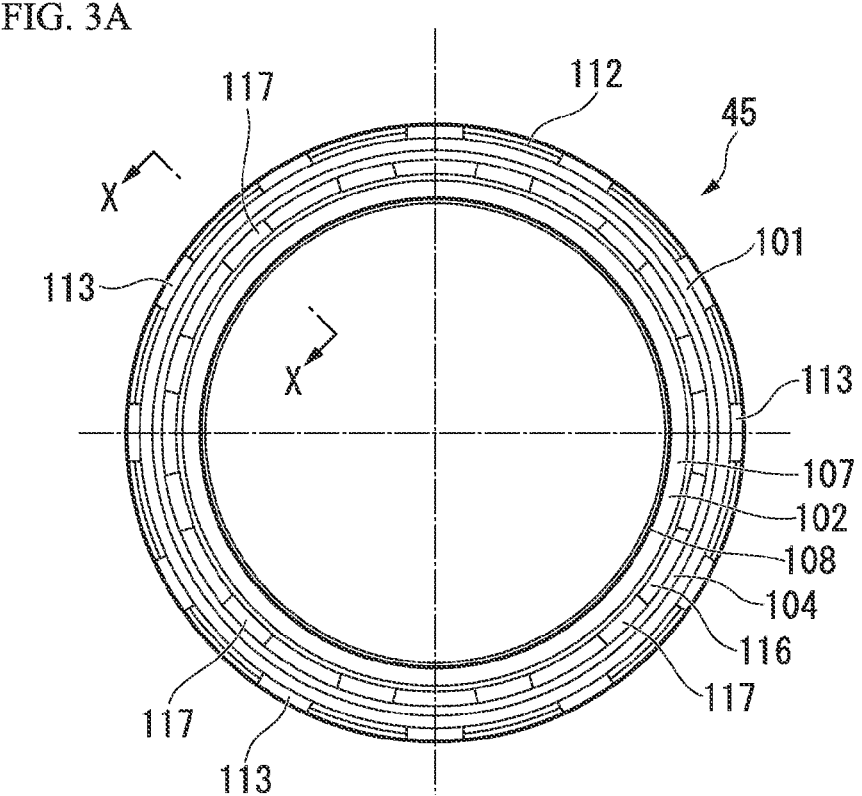
FIG. 3A is a plan view showing a piston seal of the master cylinder of the first embodiment.
Figure 3B:
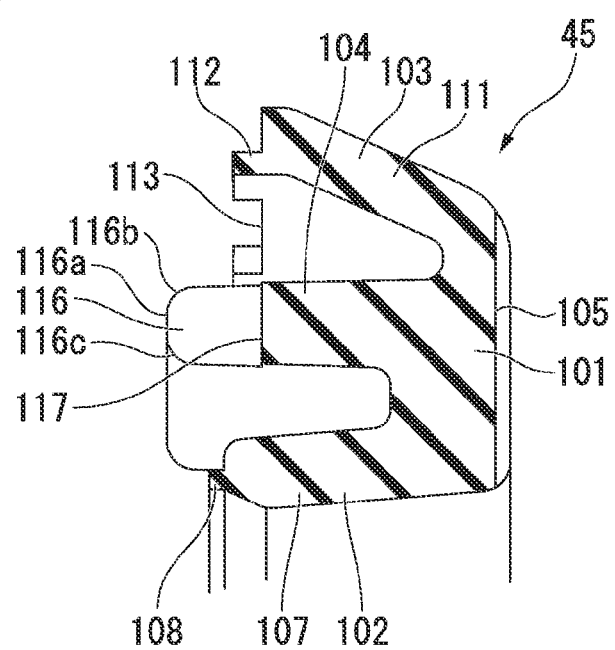
FIG. 3B is a cross-sectional view taken along line X-X of FIG. 3A.

The piston seal 45 in a natural state before incorporation into the master cylinder 11 will be described with reference to FIGS. 3A and 3B. The base section 101 of the piston seal 45 is parallel to a surface perpendicular to an axis of the piston seal 45. The inner circumferential lip section 102 has a tapered cylindrical shape having a diameter that is slightly reduced as it goes away from the base section 101. In addition, the outer circumferential lip section 103 has a tapered cylindrical shape having a diameter that increases as it goes away from the base section 101. The center lip section 104 extends from the base section 101 to form a cylindrical shape concentrically with a center axis of the piston seal 45. The center lip section 104 has a shape having a thickness that is slightly reduced in the radial direction as it goes toward an extending distal end.

A groove section 105 passing through the radial direction is formed at a surface of the base section 101 opposite to each of the lip sections 102 to 104. The inner circumferential lip section 102 is configured of a main body section 107 extending from the base section 101, and a thin section 108 having a thickness in the radial direction smaller than that of the base section 101 at an end section of the main body section 107 opposite to the base section 101. The thin section 108 is formed at an intermediate position in the radial direction of the main body section 107.

The outer circumferential lip section 103 is configured of a main body section 111 extending from the base section 101, and a thin section 112 having a thickness in the radial direction smaller than that of the base section 101 at an end section of the main body section 111 opposite to the base section 101. The thin section 112 is formed at an inner end position in the radial direction of the main body section 111. A plurality of slits 113 opened in a direction opposite to the base section 101 and passing through the radial direction are formed in the thin section 112 of the outer circumferential lip section 103 at equal intervals in the circumferential direction.

In the center lip section 104, a distal end abutting section 116 opposite to the base section 101 thereof has a distal end surface section 116a, an outer R chamfering section 116b outside in the radial direction of the distal end surface section 116a, and an inner R chamfering section 116c inside in the radial direction of the distal end surface section 116a. The distal end surface section 116a has a flat surface parallel to a surface perpendicular to the axis of the piston seal 45. Since the outer R chamfering section 116b has a diameter that is reduced as it goes toward the distal end surface section 116a in the axial direction of the piston seal 45, the outer R chamfering section 116b has an arc shape in which a cross section including a center axis of the piston seal 45 has a center in the piston seal 45. Since the inner R chamfering section 116c has a diameter that increases as it goes toward the distal end surface section 116a in the axial direction of the piston seal 45, the inner R chamfering section 116c has an arc shape in which a cross section including a center axis of the piston seal 45 has a center in the piston seal 45. A plurality of slits 117 opened in a direction opposite to the base section 101 and passing through the radial direction are formed at a distal end section including the distal end abutting section 116 of the center lip section 104 at equal intervals in the circumferential direction.

Further, an end section position of the center lip section 104 near the base section 101 of the slit 117 coincides with end section positions of the thin section 112 and the slit 113 of the outer circumferential lip section 103 near the base section 101. These end section positions are disposed closer to the base section 101 than the end section position of the inner circumferential lip section 102 opposite to the base section 101 of the main body section 107. Further, an end section position of the inner circumferential lip section 102 opposite to the base section 101 is disposed at an opposite side of the base section 101 farther than the end section position of the outer circumferential lip section 103 opposite to the base section 101. Accordingly, the inner circumferential lip section 102 including the thin section 108 protrudes farther than the outer circumferential lip section 103. In addition, a depth of the slit 117 from the distal end surface section 116a is larger than the length in the cylinder axis direction of the stepped surface section 92 of the circumferential groove 32 shown in FIG. 2.

Next, the piston seal 45 in a basic state (a non-braking state before the brake pedal is manipulated) incorporated into the master cylinder 11 to come in appropriate contact with the cylindrical surface section 95 of the stepped section 75 of the primary piston 18 and separated from the circumferential wall 90 will be described with reference to FIG. 2.

In the basic state, the base section 101 of the piston seal 45 is disposed closest to the opening section 16 side (a right side of FIG. 2) of the cylinder main body 15 in a posture parallel to a surface perpendicular to the cylinder axis. Accordingly, the base section 101 is disposed to be opposite to the circumferential wall 89 of the circumferential groove 32, and abuts the circumferential wall 89. In addition, the inner circumferential lip section 102 disposed at the innermost circumferential side comes in contact with the cylindrical surface section 95 of the outer circumferential section of the primary piston 18 at the inner circumferential section thereof. In this state, the inner circumferential lip section 102 forms a cylindrical shape about the cylinder axis. The inner circumferential section of the inner circumferential lip section 102 comes in sliding contact with the outer circumferential section of the primary piston 18 through movement in the cylinder axis direction of the primary piston 18.

In the basic state, the outer circumferential lip section 103 disposed at the outermost circumferential side of the piston seal 45 abuts the groove bottom section 88 of the circumferential groove 32 at the outer circumferential section thereof. In addition, the center lip section 104 is in the same posture as in the natural state and forms a cylindrical shape about the cylinder axis, and the distal end surface section 116a of the distal end abutting section 116 is parallel to a surface perpendicular to the cylinder axis. The center lip section 104 extends closer to the bottom section 13 of the cylinder main body 15 (a left side of FIG. 2) than the inner circumferential lip section 102 and the outer circumferential lip section 103, and the distal end abutting section 116 is disposed at a position opposite to the circumferential wall 90 of the circumferential groove 32 and at a position capable of abutting the circumferential wall 90 of the circumferential groove 32.

More specifically, the distal end abutting section 116 of the center lip section 104 overlaps positions in the cylinder radial direction of the stepped surface section 92 and the flat surface section 93a of the inner wall section 93. In other words, the distal end abutting section 116 is opposite to the stepped surface section 92 and the flat surface section 93a of the inner wall section 93 in the cylinder axis direction.

As a result, when the piston seal 45 moves toward the bottom section 13 of the cylinder main body 15 together with the primary piston 18 from the basic state, the distal end abutting section 116 of the center lip section 104 first abuts the stepped surface section 92 of the circumferential wall 90 at the outer R chamfering section 116b, and then abuts the flat surface section 93a of the inner wall section 93 at the distal end surface section 116a. That is, when the piston seal 45 moves toward the bottom section 13 of the cylinder main body 15, the piston seal 45 abuts the inner wall section 93 prior to the outer wall section 91 of the circumferential wall 90, and initially abuts the flat surface section 93a of the inner wall section 93. In other words, when the piston seal 45 moves toward the bottom section 13 of the cylinder main body 15, the inner wall section 93 is formed at a position at which the center lip section 104 abuts the inner wall section 93 prior to the outer wall section 91. When the piston seal 45 moves toward the bottom section 13 of the cylinder main body 15, the flat surface section 93a of the inner wall section 93 is formed at a position at which the center lip section 104 first abuts the flat surface section 93a of the inner wall section 93.

Here, provided that a distance from the inner end position in the cylinder radial direction of the piston seal 45 (in other words, the cylindrical surface section 95) to an outer end position in the cylinder radial direction of the distal end abutting section 116 of the center lip section 104 is Lx, a distance from an end section of the piston seal 45 near the opening section 16 of the cylinder main body 15 to a contact position of the center lip section 104 with the stepped surface section 92 is Ly and a friction coefficient between the piston seal 45 and the circumferential wall 90 is μ, an angle θ of the stepped surface section 92 with respect to the cylinder radial direction may be set to satisfy the following relation.

$$\theta > \tan^{-1}\{(Lx/Ly)-\mu\}/\{\mu(Lx/Ly)+1\}$$

When there is no input from the brake pedal (not shown) side, and as shown in FIG. 2, the primary piston 18 is disposed at the basic position (the non-braking position) at which the port 76 is opened in the opening groove 47, the piston seal 45 is configured such that the inner circumferential sections of the inner circumferential lip section 102 and the base section 101 are disposed at positions of the cylindrical surface section 95 of the stepped section 75 of the primary piston 18 and the inner circumferential section of the base section 101 overlaps a position in the cylinder axis direction at a portion of the port 76. Here, the center lip section 104 is spaced apart from the circumferential wall 90, and the distal end abutting section 116 overlaps positions in the cylinder radial direction of the stepped surface section 92 of the circumferential wall 90 and the flat surface section 93a of the inner wall section 93.

Figure 4A:
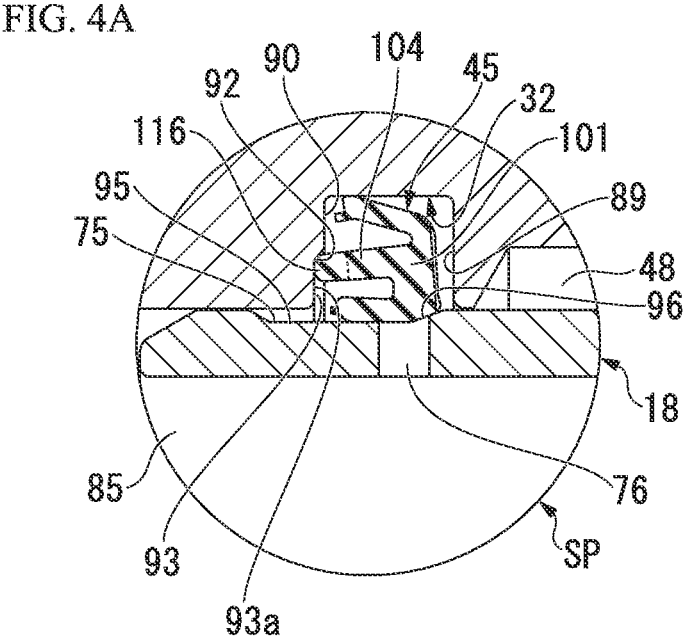
FIG. 4A is a cross-sectional view for sequentially describing states upon movement of a piston of the master cylinder of the first embodiment.

Then, when there is no input from the brake pedal side, and as shown in FIG. 4A, the primary piston 18 moves toward the bottom section 13 of the cylinder main body 15 (a left side of FIG. 4A), the piston seal 45 moves toward the circumferential wall 90 in the circumferential groove 32 together with the primary piston 18 and the base section 101 is spaced apart from the circumferential wall 89. At the same time, the distal end abutting section 116 of the center lip section 104 abuts the stepped surface section 92 of the circumferential wall 90, and abuts the flat surface section 93a of the inner wall section 93 through guidance of the stepped surface section 92. When the primary piston 18 moves further toward the bottom section 13 of the cylinder main body 15, in the piston seal 45 abutting the flat surface section 93a at the center lip section 104 to restrict movement thereof, the base section 101 runs on the tapered surface section 96 of the stepped section 75, crosses over and closes the port 76, and blocks communication between the primary pressure chamber 85 and the primary supply passage 48. Further, in a range from the position shown in FIG. 4A and to the position of the primary piston 18 disposed at the bottom section 13 side of the cylinder main body 15, the piston seal 45 blocks a space between the primary pressure chamber 85 and the primary supply passage 48 to close the primary pressure chamber 85. In this state, basically, a hydraulic pressure P2 of the primary pressure chamber 85 is higher than a hydraulic pressure P1 of the primary supply passage 48, which is atmospheric pressure, and the brake liquid in the primary pressure chamber 85 is supplied from the primary discharge passage 27 shown in FIG. 1 into the braking cylinder of the wheel side.

Figure 4B:
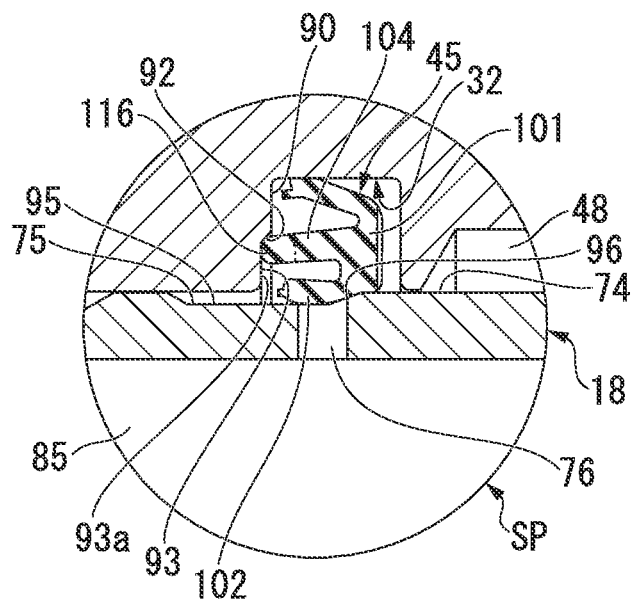
FIG. 4B is a cross-sectional view for sequentially describing the states upon movement of the piston of the master cylinder of the first embodiment.
Figure 4C:
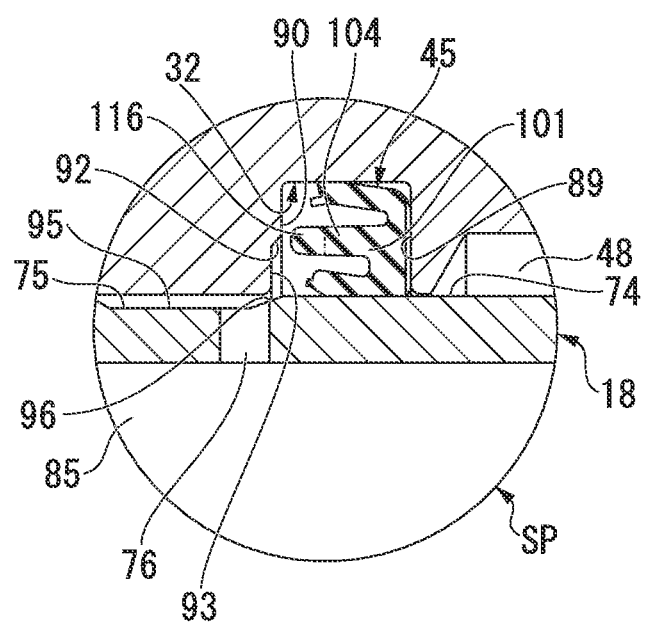
FIG. 4C is a cross-sectional view for sequentially describing the states upon movement of the piston of the master cylinder of the first embodiment.

After closing the port 76, when the primary piston 18 moves further toward the bottom section 13 of the cylinder main body 15, as shown in FIG. 4B, the base section 101 of the piston seal 45 passes over the tapered surface section 96 and runs on the outer diameter section 74. At the same time, the inner circumferential lip section 102 runs on the tapered surface section 96, and then, as shown in FIG. 4C, the inner circumferential lip section 102 runs on the outer diameter section 74. Then, the piston seal 45 moves toward the circumferential wall 89 in the circumferential groove 32 due to an increase in hydraulic pressure of the above-mentioned primary pressure chamber 85. Accordingly, the base section 101 abuts the circumferential wall 89 while the center lip section 104 is separated from the circumferential wall 90.

Here, the base section 101 of the piston seal 45 abuts the tapered surface section 96 of the stepped section 75 as shown in FIG. 4A. The base section 101 of the piston seal 45 is configured to move further toward the circumferential wall 90 in the circumferential groove 32 along with movement of the primary piston 18 if it is impossible to smoothly slide the tapered surface section 96 when pressed in the cylinder axis direction at the tapered surface section 96. Then, in the piston seal 45, since a moving range is limited in the circumferential groove 32, a rotational moment in a direction in which an inner circumferential side of the piston seal 45 moves toward the bottom section 13 of the cylinder main body 15 and an outer circumferential side of the piston seal 45 moves toward the opening section 16 of the cylinder main body 15 is generated in the piston seal 45. However, here, as described above, since the distal end abutting section 116 of the center lip section 104 of the piston seal 45 abuts the flat surface section 93a of the inner wall section 93 of the circumferential groove 32, and the center lip section 104 abuts the stepped surface section 92 outside in the cylinder radial direction of the flat surface section 93a with respect to the rotational moment, the rotation of the piston seal 45 including the center lip section 104 is restricted.

In addition, as shown in FIG. 4C, when the brake pedal (not shown) starts to return from a state in which the primary piston 18 moves toward the bottom section 13 of the cylinder main body 15 to release the braking, the primary piston 18 starts to return to a standby position shown in FIG. 2 by the gap adjustment section 79 shown in FIG. 1. A capacity of the primary pressure chamber 85 increases by movement of the primary piston 18. Here, when recovery of the brake liquid via the brake pipeline cannot follow an increase in capacity of the primary pressure chamber 85, after the hydraulic pressure P1 of the primary supply passage 48, which is atmospheric pressure, becomes equal to the hydraulic pressure P2 of the primary pressure chamber 85, the hydraulic pressure P2 in the primary pressure chamber 85 becomes a negative pressure, and the hydraulic pressure P2 of the primary pressure chamber 85 becomes lower than the hydraulic pressure P1 of the primary supply passage 48, which is atmospheric pressure. Then, the negative pressure in the primary pressure chamber 85 separates the base section 101 from the circumferential wall 89 while separating the outer circumferential lip section 103 of the piston seal 45 from the groove bottom section 88. As a result, the brake liquid of the primary supply passage 48 is supplied into the primary pressure chamber 85 via a flow path of a gap between the circumferential wall 89 and the base section 101, a gap between the groove bottom section 88 and the outer circumferential lip section 103 and a gap between the circumferential wall 90 and the slit 117 of the center lip section 104. Accordingly, the primary pressure chamber 85 is configured to return the hydraulic pressure P2 from the negative pressure state to atmospheric pressure.

In the master cylinder disclosed in the above-mentioned Patent Literature 1, the circumferential wall of the circumferential groove near the cylinder bottom section is configured of the outer wall section extending from the bottom section of the circumferential groove parallel to the direction perpendicular to the cylinder axis, and the tapered wall section extending to be inclined to approach the cylinder bottom section as it goes from the outer wall section inward in the cylinder radial direction. When the seal member moves toward the cylinder bottom section, the center lip section of the seal member first abuts the outer wall section. For this reason, when a rotational moment in a direction in which the inner circumferential side moves toward the cylinder bottom section and the outer circumferential side moves toward the cylinder opening section is generated at the seal member by being pulled with the piston without smooth sliding with respect to the piston, in the seal member, the center lip section may relatively easily move along the outer wall section and the inner circumferential lip section may rotate in a direction to be separated from the piston, and thus the base section may excessively move toward the cylinder bottom section. Then, the seal position to close the port of the piston by the seal member is deviated toward the cylinder bottom section, and thus invalid strokes, which are a moving amount of the piston until the brake hydraulic pressure is generated, may increase.

On the other hand, according to the master cylinder of the first embodiment, even when a rotational moment is generated at the piston seal 45 in a direction in which the inner circumferential side moves toward the bottom section 13 of the cylinder main body 15 and the outer circumferential side moves toward the opening section 16 of the cylinder main body 15 by movement of the primary piston 18, the center lip section 104 of the piston seal 45 abuts the stepped surface section 92 outside in the cylinder radial direction of the flat surface section 93a as described above, and rotation of the piston seal 45 including the center lip section 104 is restricted. As a result, as deviation of the seal position of the piston seal 45 to close the port 76 of the primary piston 18 toward the bottom section 13 of the cylinder main body 15 are suppressed, an increase in invalid strokes can be suppressed.

In addition, in the master cylinder disclosed in the above-mentioned Patent Literature 1, for example, when the tapered wall section is capable of being expanded outside in the cylinder radial direction and the center lip section is capable of abutting the tapered wall section prior to the outer wall section, the above-mentioned rotation of the seal member section can be suppressed by the tapered wall. However, since the tapered wall section is continued to the inner circumferential section of the cylinder main body, the center lip section is guided into the gap between the inner circumferential section of the cylinder main body and the piston at the tapered wall section to be sandwiched in the gap, i.e., biting may occur.

On the other hand, according to the master cylinder of the first embodiment, since the inner wall section 93 has the flat surface section 93a parallel to the radial direction of the cylinder main body 15, the center lip section 104 of the piston seal 45 remains in the flat surface section 93a, and thus the center lip section 104 can be prevented from being guided into the gap between the inner circumferential section of the cylinder main body 15 and the primary piston 18. Accordingly, occurrence of the biting can be suppressed.

In addition, according to the master cylinder of the first embodiment, since the stepped surface section 92 is formed to be inclined with respect to the axial direction of the cylinder main body 15, even when the center lip section 104 of the piston seal 45 abuts the stepped surface section 92 prior to the inner wall section 93, the stepped surface section 92 is capable of smoothly moving to the inner wall section 93 without damage thereto.

In addition, when the piston seal 45 moves toward the bottom section 13 of the cylinder main body 15, since the center lip section 104 first abuts the flat surface section 93a of the inner wall section 93, the center lip section 104 can be further prevented from being guided into the gap between the inner circumferential section of the cylinder main body 15 and the primary piston 18, and occurrence of the biting can be suppressed.

In addition, since the center lip section 104 is formed to protrude in the axial direction farther than the inner circumferential lip section 102 and the outer circumferential lip section 103, the piston seal 45 can be more securely prevented from rotating.

[Second Embodiment]

Next, a second embodiment will be described mainly based on FIGS. 5 and 6A to 6C with focusing differences from the first embodiment. Further, the same components as of the first embodiment will be referred to by the same names and designated by the same reference numerals.

Figure 5:
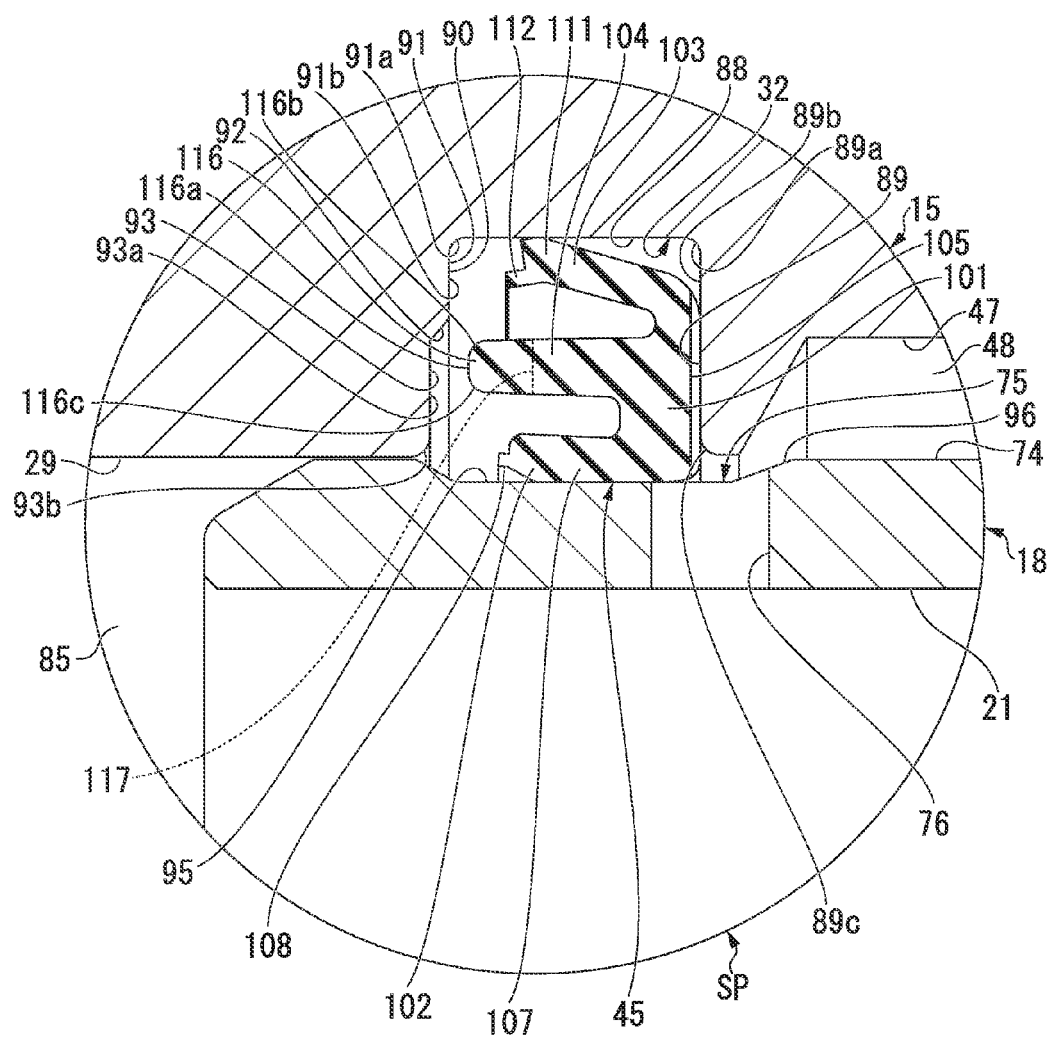
FIG. 5 is a partially enlarged cross-sectional view showing major parts of a master cylinder of a second embodiment according to the present invention.

In the second embodiment, as shown in FIG. 5, a position in the cylinder radial direction of the stepped surface section 92 in the circumferential wall 90 of the circumferential groove 32 is deviated further outward in the cylinder radial direction than in the first embodiment. That is, a diameter of the stepped surface section 92 is larger than that of the first embodiment. Accordingly, in a basic state in which the piston seal 45 is in appropriate contact with the cylindrical surface section 95 of the stepped section 75 of the primary piston 18 and separated from the circumferential wall 90 as shown in FIG. 5, the distal end abutting section 116 of the center lip section 104 causes only the flat surface section 93a of the inner wall section 93 to overlap a position in the cylinder radial direction. As a result, when the piston seal 45 moves toward the bottom section 13 of the cylinder main body 15 together with the primary piston 18 from the basic state, the distal end abutting section 116 of the center lip section 104 first abuts the flat surface section 93a of the inner wall section 93. That is, when the piston seal 45 moves toward the bottom section 13 of the cylinder main body 15, the inner wall section 93 is formed at a position to first abut the center lip section 104.

Figure 6A:
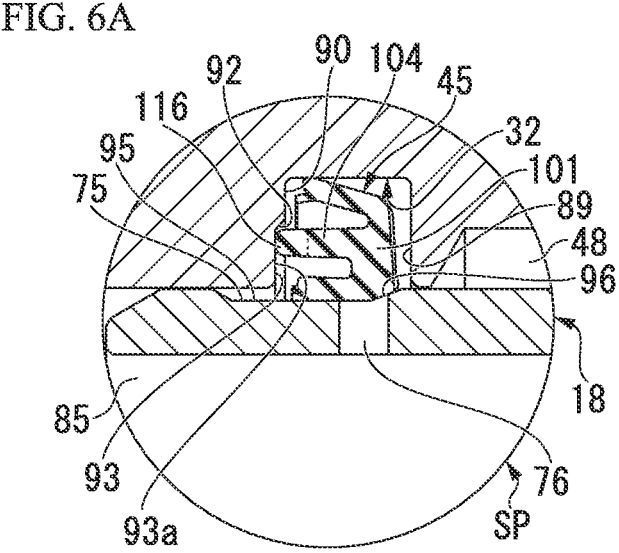
FIG. 6A is a cross-sectional view for sequentially describing states upon movement of a piston of the master cylinder of the second embodiment.

When there is an input from the brake pedal side, and as shown in FIG. 6A, the primary piston 18 moves toward the bottom section 13 of the cylinder main body 15 (a left side of FIGS. 6A to 6C), the piston seal 45 moves toward the circumferential wall 90 in the circumferential groove 32 together with the primary piston 18, the base section 101 is separated from the circumferential wall 89, and the distal end abutting section 116 of the center lip section 104 abuts the flat surface section 93a of the inner wall section 93 of the circumferential wall 90 without abutting the stepped surface section 92. When the primary piston 18 moves further toward the bottom section 13 of the cylinder main body 15, in the piston seal 45 abutting the flat surface section 93a at the center lip section 104 to restrict movement thereof, the base section 101 runs on the tapered surface section 96 of the stepped section 75 to cross over and close the port 76, and blocks communication between the primary pressure chamber 85 and the primary supply passage 48.

Figure 6B:
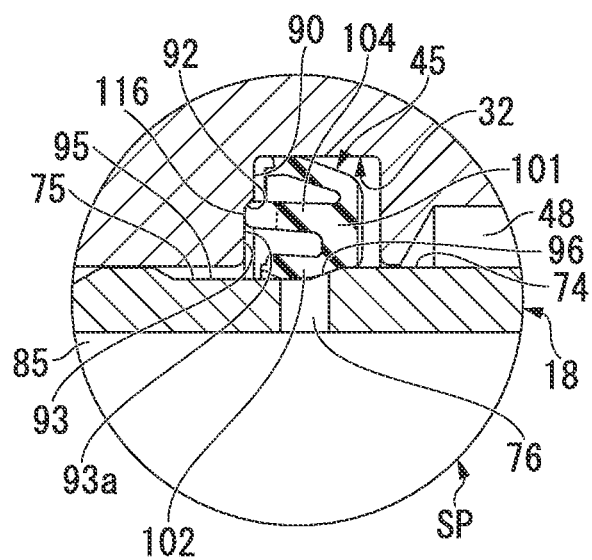
FIG. 6B is a cross-sectional view for sequentially describing the states upon movement of the piston of the master cylinder of the second embodiment.
Figure 6C:
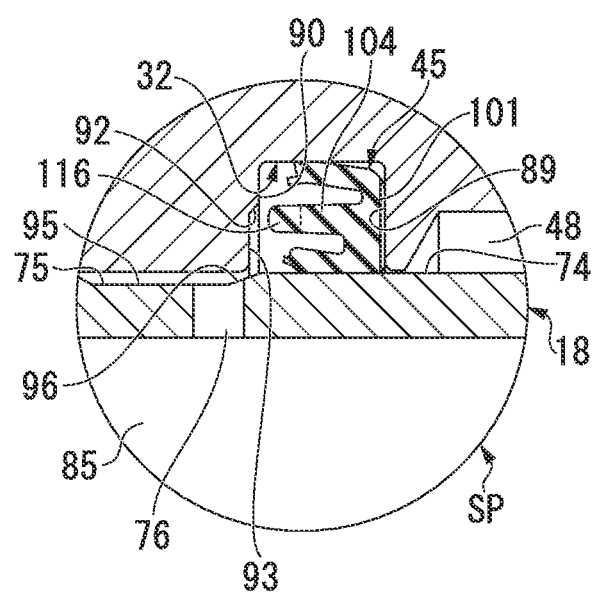
FIG. 6C is a cross-sectional view for sequentially describing the states upon movement of the piston of the master cylinder of the second embodiment.

After that, as shown in FIG. 6B, the base section 101 of the piston seal 45 crosses over the tapered surface section 96 and runs on the outer diameter section 74, and the inner circumferential lip section 102 runs on the tapered surface section 96. Then, as shown in FIG. 6C, the inner circumferential lip section 102 runs on the outer diameter section 74, the piston seal 45 moves toward the circumferential wall 89 in the circumferential groove 32 due to an increase in hydraulic pressure of the primary pressure chamber 85, and thus the base section 101 abuts the circumferential wall 89 while the center lip section 104 is separated from the circumferential wall 90.

Further, even in the second embodiment, when the base section 101 of the piston seal 45 cannot smoothly slide on the tapered surface section 96 of the stepped section 75, the piston seal 45 moves toward the circumferential wall 90 in the circumferential groove 32 according to movement of the primary piston 18. Accordingly, a rotational moment in a direction in which the inner circumferential side moves toward the bottom section 13 of the cylinder main body 15 and the outer circumferential side moves toward the opening section 16 of the cylinder main body 15 is generated at the piston seal 45. Here, since the distal end section of the center lip section 104 of the piston seal 45 abuts the flat surface section 93a of the inner wall section 93 of the circumferential groove 32 as described above, like the first embodiment, the center lip section 104 abuts the stepped surface section 92 outside in the cylinder radial direction of the flat surface section 93a with respect to the rotational moment, restricting rotation of the piston seal 45.

According to the above-mentioned second embodiment, the same effect as of the first embodiment can be obtained, and an effect of improving durability of the piston seal 45 by reducing a frequency of abutting the stepped surface section 92 of the center lip section 104 can be obtained.

[Third Embodiment]

Figure 7:
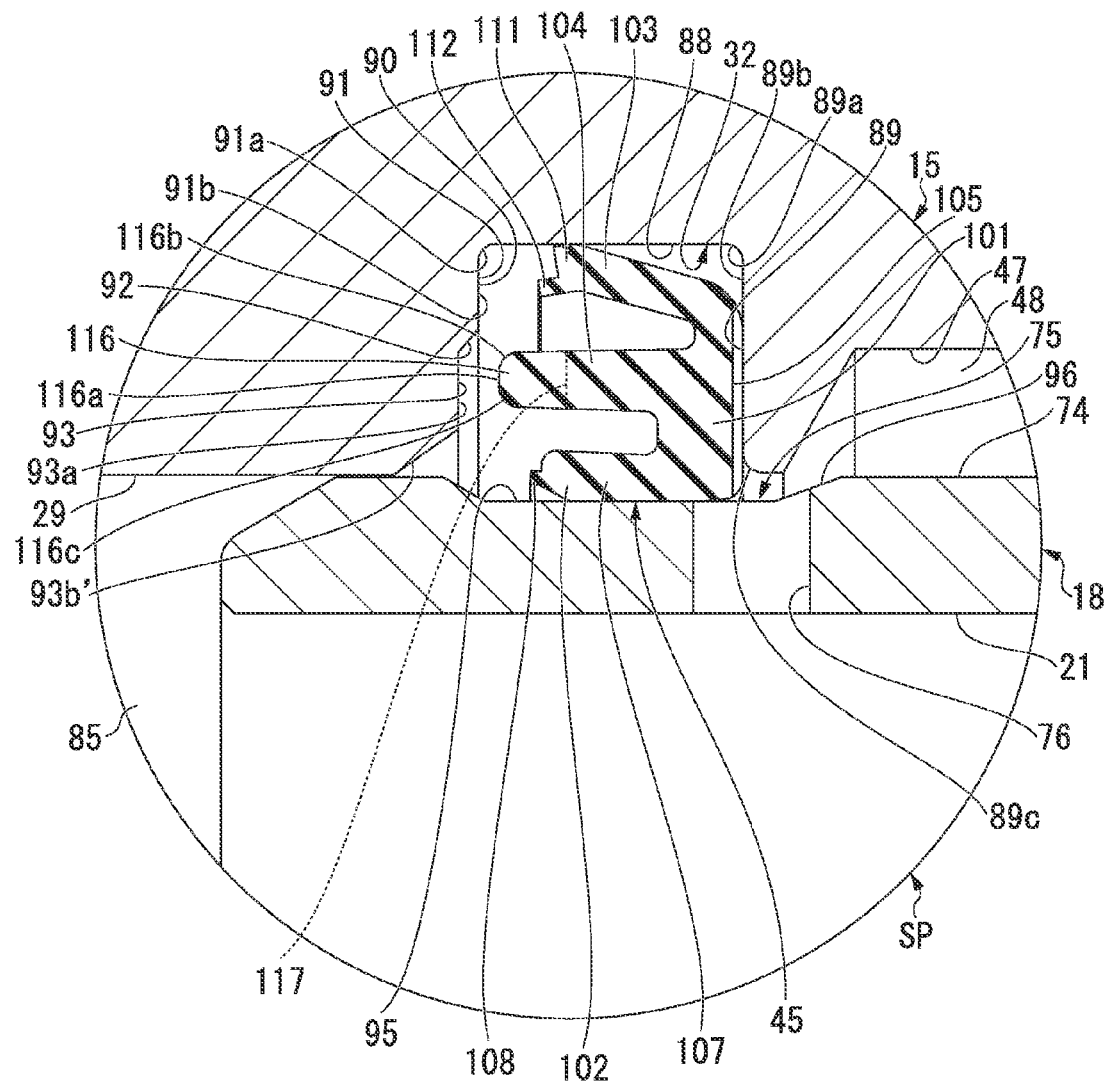
FIG. 7 is a partially enlarged cross-sectional view showing major parts of a master cylinder of a third embodiment according to the present invention.

Next, a third embodiment will be described mainly based on FIG. 7 while focusing on differences from the second embodiment. Further, the same components as of the second embodiment will be referred to by the same names and designated by the same reference numerals.

In the third embodiment, a chamfering section 93b' having a tapered shape with a diameter reduced toward the bottom section 13 of the cylinder main body 15 (a left side of FIG. 7) is formed at the inner wall section 93 of the circumferential wall 90 instead of the R chamfering section 93b of the first embodiment. A boundary position between the chamfering section 93b' and the flat surface section 93a is disposed between the center lip section 104 of the piston seal 45 and the inner circumferential lip section 102, and the chamfering section 93b' is increased to be larger in size in both the cylinder radial direction and the cylinder axis direction than the R chamfering section 93b of the first embodiment. Further, a relation between a difference Mx between the maximum radius of the chamfering section 93b' and the radius of the cylindrical surface section 95, a thickness Cx in the radial direction of the distal end abutting section 116 of the center lip section 104 and a thickness Ix in the radial direction of the main body section 107 of the inner circumferential lip section 102 may satisfy following relation such that the center lip section 104 does not enter between the chamfering section 93b' and the cylindrical surface section 95.

$$Mx < Ix + Cx$$

According to the above-mentioned third embodiment, the same effect as of the first embodiment can be obtained, and biting between the cylinder main body 15 and the primary piston 18 of the inner circumferential lip section 102 can be suppressed.

[Fourth Embodiment]

Figure 8:
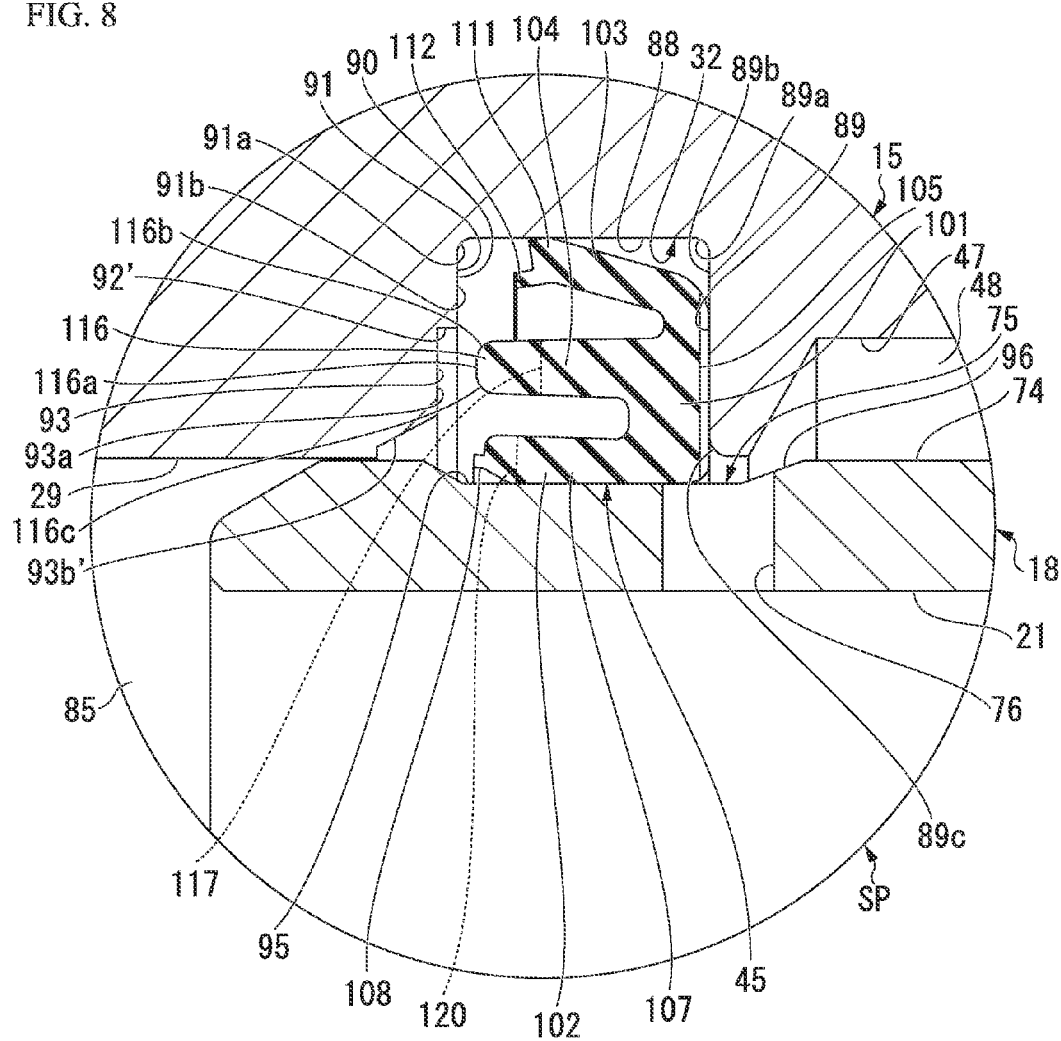
FIG. 8 is a partially enlarged cross-sectional view showing major parts of a master cylinder of a fourth embodiment according to the present invention.

Next, a fourth embodiment will be described mainly based on FIG. 8 while focusing on differences from the third embodiment. Further, the same components as of the first embodiment will be referred to by the same names and designated by the same reference numerals.

In the fourth embodiment, a stepped surface section 92' having a cylindrical surface shape about the cylinder axis is formed between the outer wall section 91 and the inner wall section 93. In addition, in the fourth embodiment, the inner circumferential lip section 102 of the piston seal 45 extends to an opposite side of the base section 101 farther than the center lip section 104. That is, an extension length from the base section 101 of the inner circumferential lip section 102 is larger than a length of the center lip section 104. Then, a slit 120 opened at an opposite side of the base section 101 and passing through the cylinder radial direction is formed at a distal end section of the inner circumferential lip section 102 opposite to the base section 101.

Even in the fourth embodiment, when the base section 101 of the piston seal 45 does not smoothly slide on the tapered surface section 96 of the stepped section 75, a rotational moment in a direction in which the inner circumferential side moves toward the bottom section 13 of the cylinder main body 15 (a left side of FIG. 8) and the outer circumferential side moves toward the opening section 16 of the cylinder main body 15 (a right side of FIG. 8) is generated at the piston seal 45. Here, like the first embodiment, as the distal end abutting section 116 of the center lip section 104 of the piston seal 45 abuts the stepped surface section 92', and further, the inner circumferential lip section 102 abuts the chamfering section 93b', rotation of the piston seal 45 is restricted by both thereof. As a result, an increase in invalid strokes can be more securely suppressed.

In addition, since movement of the center lip section 104 can be further restricted by the stepped surface section 92' having a cylindrical surface formed in the cylinder axis direction, the inner circumferential lip section 102 is capable of securely abutting the chamfering section 93b', and rotation of the piston seal 45 is capable of being further restricted.

Further, since the slit 120 passing through the cylinder radial direction is formed at the distal end section of the inner circumferential lip section 102, even when the inner circumferential lip section 102 extends, the brake liquid of the primary supply passage 48 can be flowed into the primary pressure chamber 85 by a negative pressure in the primary pressure chamber 85 via a flow path of a gap between the circumferential wall 89 and the base section 101, a gap between the groove bottom section 88 and the outer circumferential lip section 103, a gap between the circumferential wall 90 and the slit 117 of the center lip section 104 and a gap between the circumferential wall 90 and the slit 120 of the inner circumferential lip section 102. For this reason, performance of a liquid supply is not lowered.

While the seal structure section SP of the primary side has been exemplarily described in detail above, since the seal structure section SS of the secondary side also has the same structure, the same effect can be obtained.

The above-mentioned embodiment provides a master cylinder having a cylinder main body with a bottomed cylindrical shape having an discharge passage of a brake liquid and a supply passage in communication with a reservoir, a piston slidably disposed in the cylinder main body and forming a pressure chamber configured to supply a hydraulic pressure into the discharge passage between the cylinder main body and the piston, and a seal member installed in a circumferential groove formed in the cylinder main body and configured to seal between the supply passage and the pressure chamber, wherein the seal member has a base section configured to abut a circumferential wall of the circumferential groove near an opening section of the cylinder main body, an inner circumferential lip section extending from the base section toward a bottom section of the cylinder main body and in sliding contact with an outer circumference of the piston, an outer circumferential lip section extending from the base section toward the bottom section of the cylinder main body and configured to abut a bottom section of the circumferential groove, and a center lip section having a distal end extending from the base section toward the bottom section of the cylinder main body between the outer circumferential lip section and the inner circumferential lip section and configured to abut the circumferential wall of the circumferential groove near the bottom section of the cylinder main body. The circumferential wall of the circumferential groove near the bottom section of the cylinder main body has an outer wall section extending from the bottom section of the circumferential groove in a radial direction of the cylinder main body, a stepped surface section extending from the outer wall section in a bottom direction of the cylinder main body, and an inner wall section having a flat surface section parallel to the radial direction of the cylinder main body and formed further inside in the radial direction of the cylinder main body than the stepped surface section. The inner wall section is formed at a position at which the center lip section abuts the inner wall section prior to the outer wall section when the seal member moves toward the bottom section of the cylinder main body. Accordingly, when the seal member moves toward the bottom section of the cylinder main body with movement of the piston, the distal end of the center lip section abuts the inner wall section prior to the outer wall section. Accordingly, after that, even when a rotational moment in a direction in which an inner circumferential side moves toward the bottom section of the cylinder main body and an outer circumferential side moves toward the opening section of the cylinder main body is generated at the seal member, the center lip section of the seal member abuts the stepped surface section extending from the outer wall section to the bottom direction of the cylinder main body, restricting rotation of the seal member including the center lip section. As a result, an increase in invalid strokes can be suppressed.

In addition, as the stepped surface section is formed to be inclined with respect to the axial direction of the cylinder main body, even when the center lip section abuts the stepped surface section prior to the inner wall section, the center lip section is capable of smoothly moving to the inner wall section.

In addition, as the flat surface section of the inner wall section is formed at a position at which the center lip section first abuts the flat surface section of the inner wall section when the seal member moves toward the bottom section of the cylinder main body, since the center lip section first abuts the flat surface section of the inner wall section when the seal member moves toward the bottom section of the cylinder main body, the center lip section can be prevented from being guided into a gap between the inner circumferential section of the cylinder main body and the primary piston, and occurrence of biting can be suppressed.

In addition, as the center lip section is formed to protrude in the axial direction farther than the outer circumferential lip section and the inner circumferential lip section, the seal member can be securely prevented from rotating.

INDUSTRIAL APPLICABILITY

According to the above-mentioned master cylinder, an increase in invalid strokes can be suppressed.

REFERENCE SIGNS LIST 11 master cylinder
12 reservoir
13 bottom section
15 cylinder main body
16 opening section
18 primary piston (piston)
19 secondary piston (piston)
26 secondary discharge passage (discharge passage)
27 primary discharge passage (discharge passage)
30, 32 circumferential groove
35, 45 piston seal (seal member)
38 secondary supply passage (supply passage)
48 primary supply passage (supply passage)
68 secondary pressure chamber (pressure chamber)
85 primary pressure chamber (pressure chamber)

88 groove bottom section (bottom section of circumferential groove)
89 circumferential wall (circumferential wall of cylinder main body near opening section)
90 circumferential wall (circumferential wall of cylinder main body near bottom section)
91 outer wall section
92 stepped surface section
93 inner wall section
93a flat surface section
101 base section
102 inner circumferential lip section
103 outer circumferential lip section
104 center lip section

The invention claimed is:

1. A master cylinder comprising:
a cylinder main body with a bottomed cylindrical shape having a discharge passage of a brake liquid and a supply passage in communication with a reservoir;
a piston movably disposed in the cylinder main body and forming a pressure chamber configured to supply a hydraulic pressure into the discharge passage between the cylinder main body and the piston; and
a seal member installed in a circumferential groove formed in the cylinder main body and capable of sealing between the supply passage and the pressure chamber,
wherein the seal member comprises:
a base section capable of abutting a circumferential wall of the circumferential groove near an opening section of the cylinder main body;
an inner circumferential lip section extending from the base section toward a bottom section of the cylinder main body and configured to come in sliding contact with an outer circumference of the piston;
an outer circumferential lip section extending from the base section toward the bottom section of the cylinder main body and configured to abut a bottom section of the circumferential groove; and
a center lip section extending from the base section toward the bottom section of the cylinder main body between the outer circumferential lip section and the inner circumferential lip section and having a distal end configured to abut the circumferential wall of the circumferential groove near the bottom section of the cylinder main body,
wherein the circumferential wall of the circumferential groove near the bottom section of the cylinder main body has an outer wall section extending from the bottom section of the circumferential groove in a radial direction of the cylinder main body, a stepped surface section extending from the outer wall section in a bottom direction of the cylinder main body, and an inner wall section having a flat surface section parallel to the radial direction of the cylinder main body and formed further inside in the radial direction of the cylinder main body than the stepped surface section, and
wherein the inner wall section is formed at a position at which a distal end section of the center lip section overlaps the stepped surface section or the inner wall section in the radial direction of the cylinder main body when the seal member moves toward the bottom section of the cylinder main body.

2. The master cylinder according to claim 1, wherein the stepped surface section is formed to be inclined with respect to the axial direction of the cylinder main body.

3. The master cylinder according to claim 1, wherein the flat surface section of the inner wall section is formed at a position at which the center lip section first abuts the flat surface section of the inner wall section when the seal member moves toward the bottom section of the cylinder main body.

4. The master cylinder according to claim 1, wherein the center lip section is formed to protrude in the axial direction farther than the outer circumferential lip section and the inner circumferential lip section.

5. The master cylinder according to claim 3, wherein the center lip section is configured to abut the stepped surface section along with a movement of the piston after abutting the flat surface section of the inner wall section.

6. The master cylinder according to claim 1, wherein the stepped surface section is formed at a position at which the center lip section first abut to the stepped surface section when the seal member moves toward the bottom section of the cylinder main body.

7. The master cylinder according to claim 6, wherein the center lip section is configured to abut the flat surface section of the inner wall section along with a movement of the piston after abutting the stepped surface section.

8. The master cylinder according to claim 1, wherein the inner wall section is formed with a chamfering section at an inner end portion in the cylinder radial direction.

9. A master cylinder comprising:
a cylinder main body with a bottomed cylindrical shape, in which a piston is movably disposed, having a discharge passage of a brake liquid and a supply passage in communication with a reservoir; and
a seal member installed in a circumferential groove formed in the cylinder main body and capable of sealing between the supply passage and a pressure chamber formed in the cylinder main body,
wherein the seal member comprises:
a base section capable of abutting a circumferential wall of the circumferential groove near an opening section of the cylinder main body;
a plurality of lip sections respectively extending from both ends of the base section in a radial direction; and
a center lip section extending from the base section toward the bottom section of the cylinder main body between the plurality of lip sections and having a distal end configured to abut the circumferential wall of the circumferential groove near the bottom section of the cylinder main body,
wherein the circumferential wall of the circumferential groove near the bottom section of the cylinder main body comprises:
an outer wall section extending from the bottom section of the circumferential groove in the radial direction of the cylinder main body;
a stepped surface section extending from the outer wall section in a bottom direction of the cylinder main body and formed to be inclined with respect to an axial direction of the cylinder main body; and
an inner wall section having a flat surface section parallel to the radial direction of the cylinder main body and formed further inside in the radial direction of the cylinder main body than the stepped surface section, and
wherein the inner wall section is formed at a position at which a distal end section of the center lip section overlaps the stepped surface section or the inner wall section in the radial direction of the cylinder main body when the seal member moves toward the bottom section of the cylinder main body.

10. The master cylinder according to claim 9, wherein the flat surface section of the inner wall section is formed at a position at which the center lip section first abuts the flat surface section of the inner wall section when the seal member moves toward the bottom section of the cylinder main body.

11. The master cylinder according to claim 10, wherein the center lip section is configured to abut the stepped surface section along with a movement of the piston after abutting the flat surface section of the inner wall section.

12. The master cylinder according to claim 9, wherein the stepped surface section is formed at a position at which the center lip section first abut to the stepped surface section when the seal member moves toward the bottom section of the cylinder main body.

13. The master cylinder according to claim 12, wherein the center lip section is configured to abut the flat surface section of the inner wall section along with a movement of the piston after abutting the stepped surface section.

14. The master cylinder according to claim 9, wherein the center lip section is formed to protrude in the axial direction farther than the plurality of lip sections.

15. The master cylinder according to claim 9, wherein the inner wall section is formed with a chamfering section at an inner end portion in the cylinder radial direction.

16. A master cylinder comprising a cylinder main body with a bottomed cylindrical shape, in which a piston is movably disposed, having a discharge passage of a brake liquid and a supply passage in communication with a reservoir,
wherein the master cylinder is provided with a circumferential groove in which a seal member capable of sealing between the supply passage and a pressure chamber formed in the cylinder main body is installed,
wherein the seal member comprises:
a base section capable of abutting a circumferential wall of the circumferential groove near an opening section of the cylinder main body;
a plurality of lip sections respectively extending from both ends of the base section in a radial direction; and
a center lip section further protruding than the plurality of lip sections in an axial direction from the base section toward the bottom section of the cylinder main body between the plurality of lip sections and having a distal end configured to abut the circumferential wall of the circumferential groove near the bottom section of the cylinder main body,
wherein the circumferential wall of the circumferential groove near the bottom section of the cylinder main body comprises:
an outer wall section extending from the bottom section of the circumferential groove in the radial direction of the cylinder main body;
a stepped surface section extending from the outer wall section in a bottom direction of the cylinder main body and formed to be inclined with respect to an axial direction of the cylinder main body; and
an inner wall section having a flat surface section parallel to the radial direction of the cylinder main body and formed further inside in the radial direction of the cylinder main body than the stepped surface section, and
wherein the inner wall section is formed at a position at which a distal end section of the center lip section overlaps the stepped surface section or the inner wall section in the radial direction of the cylinder main body when the seal member moves toward the bottom section of the cylinder main body.

17. The master cylinder according to claim 16, wherein the flat surface section of the inner wall section is formed at a position at which the center lip section first abuts the flat surface section of the inner wall section when the seal member moves toward the bottom section of the cylinder main body.

18. The master cylinder according to claim 17, wherein the center lip section is configured to abut the stepped surface section along with a movement of the piston after abutting the flat surface section of the inner wall section.

19. The master cylinder according to claim 16, wherein the stepped surface section is formed at a position at which the center lip section first abut to the stepped surface section when the seal member moves toward the bottom section of the cylinder main body.

20. The master cylinder according to claim 19, wherein the center lip section is configured to abut the flat surface section of the inner wall section along with a movement of the piston after abutting the stepped surface section.

* * * * *